March 6, 1956 G. C. SZIKLAI 2,737,608

COLOR IMAGE REPRODUCTION APPARATUS

Filed Nov. 29, 1954 2 Sheets-Sheet 1

INVENTOR.
GEORGE C. SZIKLAI
BY [signature]
ATTORNEY

COLOR IMAGE REPRODUCTION APPARATUS

Filed Nov. 29, 1954 2 Sheets-Sheet 2

INVENTOR.
GEORGE C. SZIKLAI
BY
[signature]
ATTORNEY 2,737,608

COLOR IMAGE REPRODUCTION APPARATUS

George C. Sziklai, Princeton, N. J., assignor to Radio Corporation of America, a corporation of Delaware Application November 29, 1954, Serial No. 471,551

14 Claims. (Cl. 315—10)

Figure 1:
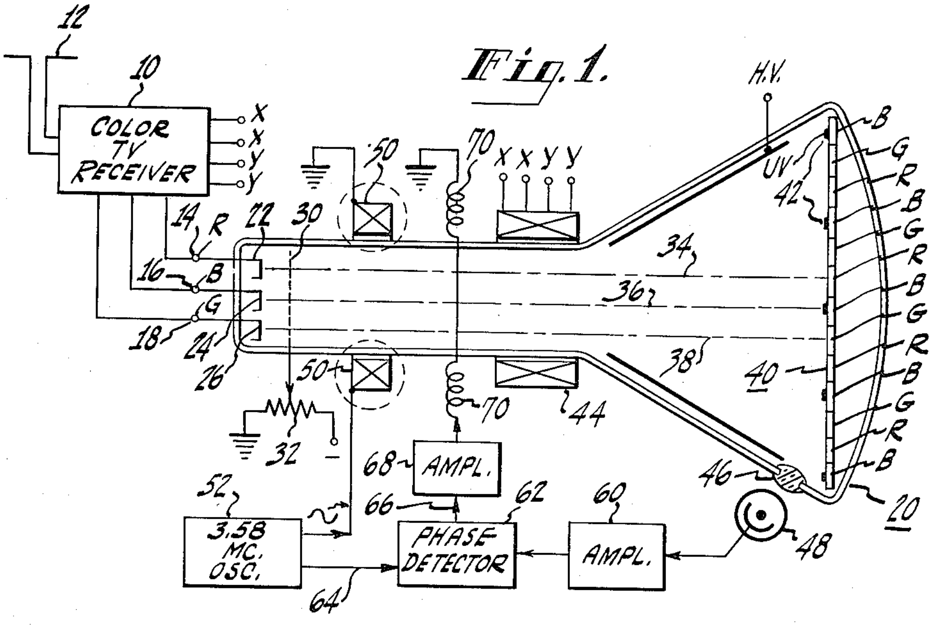

The present invention relates to new and improved color television image reproduction apparatus and, particularly, to apparatus of the type employing a cathode ray tube of the so-called horizontal "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the groups of strip-like elements. Means are provided additionally, as a practical matter, to insure tracking of the groups of color elements by the electron beam components in an orderly sequence so that the video signals representative of the respectively different component colors of the image being televised are actually employed in controlling the intensity of the beam component intended to illuminate a given color-producing element. Such means, which may be considered as partaking of the nature of a servo mechanism may employ, for example, special elements (e. g., ultra-violet light-emitting material) associated with the target screen for sensing the vertical position of the beam componens and for providing indications thereof and means responsive to such indications for correcting the vertical position of the beam components with respect to the screen.

Arrangements are known in which a single electron beam is caused to "wobble" vertically in its horizontal travel during a television line scan so that the beam successively impinges upon phosphor strips of different color characteristics and video signals respectively representative of such colors are applied successively to the beam intensity controlling electrode in the proper sequence. One proposal for insuring that the electron beam in such a tube tracks a given group of phosphor strips provides for a strip of material such as ultra-violet light-emitting phosphor which is disposed along each color phosphor of a given color, so that as the beam crosses the ultra-violet phosphor strip an indexing signal is produced which may be compared with a standard for the purpose of determining the propriety of the beam's position.

Where it is desired to employ a plurality of electron beams in a horizontal line screen color kinescope, the tracking problem is rendered more difficult.

It is a primary object of the present invention to provide novel means for causing a plurality of electron beams to track along predetermined horizontal paths in a line screen kinescope.

Another object of the invention is the provision of means for insuring, in a simple but effective manner, the tracking of predetermined paths in a horizontal line screen color kinescope by a plurality of electron beams, each of which is adapted to scan along a phosphor strip of a selected component color characteristic.

In general, the present invention provides novel color image reproducing apparatus which includes a cathode ray tube having a screen made up of a plurality of groups of horizontally oriented strip-like elements (e. g., phosphor strips) of respectively different light-emitting characteristics, and means for directing a plurality of electron beams toward the screen, the beams being spaced vertically from each other and one of the beams being horizontally displaced from the others. In accordance with a specific form of the invention, three such beams are provided and are caused to impinge upon points which define the apices of a triangle, one side of the triangle being perpendicular to the direction of the horizontal phosphor strips, so that one beam is offset horizontally from the other two beams which are, in turn, located one above the other.

A strip-like element for producing beam position index signals is located along the center of one of the phosphor strips of each group. Means are provided for causing the beams to scan, as a group, in a direction parallel to the phosphor and index strips and the beams are further subjected to a periodic rotational oscillation about a common axis. In this manner, the beam which is offset horizontally from the other two is caused to travel along an undulating path of substantial amplitude whereby to cross the index strip at a fixed rate. By virtue of the vertical in-line location of the other two beams with respect to the axis of such rotation, those beams are subjected to relatively little vertical movement. Means responsive to the signals produced by the traversal of the index strip by the offset electron beam during its oscillatory movement furnish correction signals when necessary for correcting the vertical position of the beams with respect to the groups of phosphor strips.

As will be appreciated, the present invention affords a relatively simple and inexpensive agency for producing signals indicative of the position of a plurality of electron beams in a horizontal line screen kinescope.

Figure 2A:
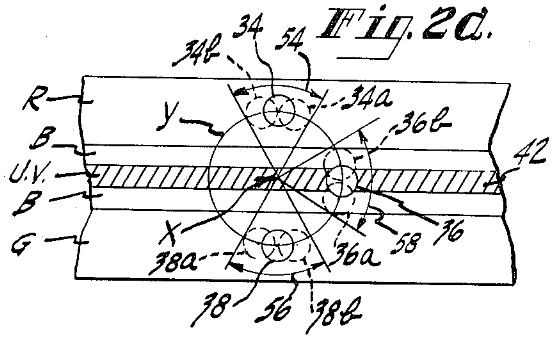
Figure 2B:
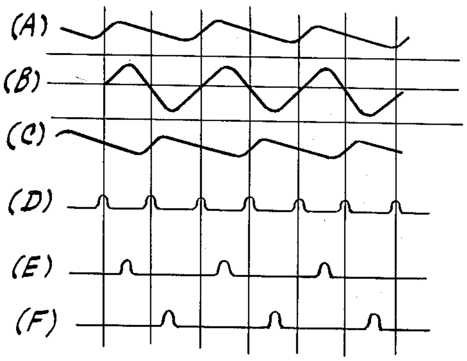
Figure 3:
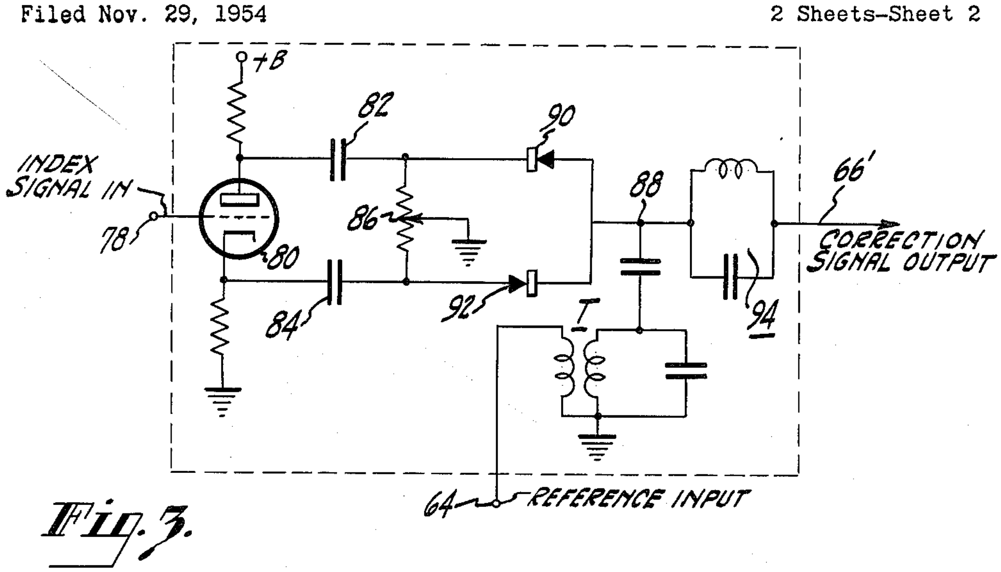
Figure 4:
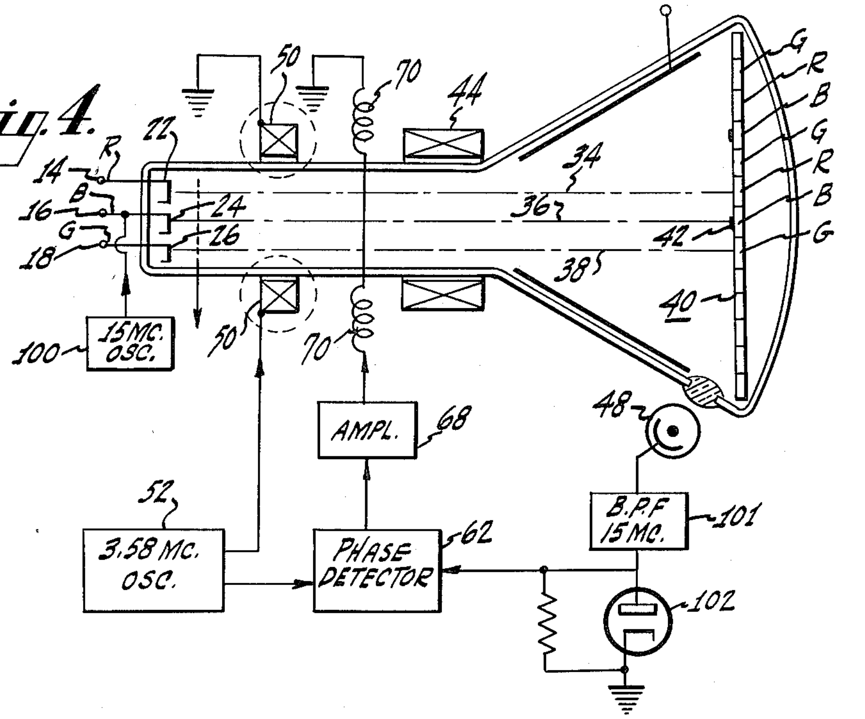

Additional objects and advantages of the present invention will become apparent to persons skilled in the art from a study of the following detailed description of the following drawing in which:

Fig. 1 illustrates, by way of a block diagram, a color television receiver embodying the principles of the present invention;

Fig. 2*a* is an enlarged fragmentary view of the luminescent screen of the apparatus of Fig. 1;

Fig. 2*b* illustrates a series of curves useful in understanding the operation of the invention;

Fig. 3 is a schematic diagram of a circuit which may be employed in performing certain of the functions indicated in Fig. 1; and Fig. 4 is a view similar to that of Fig. 1 illustrating another form of the invention.

Referring to the drawing and, particularly, to Fig. 1 thereof, there is shown a color television receiver 10 adapted to receive composite television signals which are intercepted by an antenna 12. Since the form of signals and the receiver required to operate thereupon do not constitute a part of the present invention, it is sufficient to note that the receiver 10 provides at its output terminals 14, 16 and 18, simultaneous video signals representative, respectively, of the instantaneous brightness of the red, blue and green content of the television subject. Such video signals are produced initially by the scansion of a subject in a line-by-line and field-by-field manner, means being provided for deriving separate video signals respectively indicative of the selected component colors of the subject. By way of example, the receiver 10 may be adapted to process signals of the variety standardized by the Federal Communications Commission on December 17, 1953. Circuitry suitable for deriving simultaneous red, green and blue signals may be found, for example, in the book entitled "Practical Color Television for the Service Industry," revised edition, April 1954, second edition, first printing, published by the RCA Service Company, Inc., a Radio Corporation of America subsidiary.

The selected component color signals are applied in the following manner to a color image reproducing kinescope 20. The red signal lead 14 is connected to the cathode 22 while the blue and green leads are, respectively, connected to the cathodes 24 and 26. A control electrode 30 which may be common to all four cathodes is connected adjustably to a potentiometer 32 which serves to set the D.-C. bias on the tube as a background control, in a well-known manner. The cathodes 22, 24 and 26 produce, respectively, electron beams 34, 36 and 38 which are directed toward a target screen 40 made up of a plurality of groups of horizontally disposed phosphor strips adapted, respectively, to emit red, blue and green light in response to electron beam impingement. Indexing elements in the form of strips 42 of ultra-violet light-emitting phosphor material are associated with the color phosphor strips in a symmetrical fashion. That is to say, each group of color phosphor strips includes the R, B and G and an ultra-violet strip 42 is disposed along the center of each blue phosphor strip B. The arrangement of color and ultra-violet phosphors of the screen 40 may be better understood from the showing of Fig. 2(*a*) which also illustrates the luminescent spots produced by the beams 34, 36 and 38. These beam spots, in the interest of simplicity, are designated by the same reference numerals as those which indicate the electron beams producing the spots. As will be understood from Fig. 2, therefore, during a given television line scansion the phosphor strips R, B and G which are successively arranged in the screen 40 are illuminated by the beam spots 34, 36 and 38.

The beams are caused to scan a raster made up of a plurality of vertically displaced horizontal line scansions by means of electromagnetic deflection fields produced by a conventional yoke 44 which is supplied via leads X—X and Y—Y with horizontal and vertical sawtooth currents from suitable circuits which are caused to operate at television line and field frequencies (viz. 15,750 C. P. S. and 60 C. P. S.) by means of synchronizing signals derived from the received signals.

A window 46, transparent to ultra-violet light, is provided in the conical portion of the kinescope 20 so that ultra-violet light from the strips 42 resulting from electron impingement may pass to a light-responsive photocell device 48.

It is further to be noted from Fig. 2(*a*) that the electron beams are so disposed relative to each other as to produce beam spots 34, 36 and 38 which lie at the apices of a triangle. The spots 34 and 38 are located one above the other and may be considered as defining the base of the triangle, while the spot 36 is offset horizontally therefrom. The index signal producing ultra-violet phosphor strip 42 is centrally disposed along the blue phosphor strip B.

As has been stated, means are additionally provided in the form of an electromagnetic coil 50 for subjecting the beams to a rotational oscillation having a fixed frequency. The coil 50 is an annular winding surrounding the neck of the kinescope 20 and is adapted to produce a magnetic field whose lines of flux are generally axial of the tube. The coil 50 is energized by an oscillator 52 with a sinusoidal current of, for example, 3.58 megacycles, whereby the magnetic field produced by the coil alternates between such limits as to produce beam rotation in, first, a clockwise, and then a counter-clockwise direction. The effect upon the electron beams of the magnetic field of the coil 50 is also illustrated in Fig. 2(*a*). Assuming that the center of the rotating field is at the point X which is located at the center of the base of the triangle defined by the beams, the beams will be rotated along the path of the circle Y, as shown. That is, the beam 34 will travel along the arc 54, so that at one terminus of its arcuate travel it produces the beam spot shown by the dotted circle 34(*a*), while, at the opposite terminus of its arcuate travel, it produces the beam spot shown by the dotted circuit 34(*b*). Similarly, the beam spot 38 will travel along the arc 56 to produce the corresponding spots 38(*a*) and 38(*b*) at the termini of its travel.

As will be understood, therefore, neither of the beams 34 and 38 is subjected to any appreciable vertical movement as a result of its rotational oscillation. The beam 36, however, rotates along the arc 58 to produce the beam spots 36(*a*) and 36(*b*) at opposite termini of the arc. It is apparent from Fig. 2(*a*), therefore, that the rotational oscillation of the beam 36 is manifested by a substantial vertical movement of the spot 36.

Since the beams are thus oscillated while they are travelling horizontally in a line scansion, the actual paths of the beams are generally of an undulatory nature, as illustrated by the curves (A), (B) and (C) of Fig. 2(*b*). That is, the path of the beam spot 34 as it scans horizontally along the phosphor strip R as shown by the curve (A) and the path of the spot 38 is shown by the curve (C). Curves (A) and (C) of Fig. 2(*b*) are exaggerated in amplitude for the purpose of showing that there is actually a slight amount of undulation imparted to those beams by the rotationally oscillatory field produced by the coil 50. Curve (B) shows the substantially sinusoidal path along which the beam spot 36 travels as a result of the rotationally oscillatory field. By reason of the horizontally offset location of the beam 36 with respect to the center of rotation, the amplitude of the sine wave described by the beam 36 is substantially greater than that of either of the curves (A) and (C).

It will thus be apparent that, as the beam 36 travels along its sinusoidal path, it will cross the ultra-violet light-producing strip 42 at the rate of 7.16 megacycles per second (i. e., twice during each sine wave cycle of its travel). Assuming in the interest of simplicity that the distribution of electrons in the cross section of the beam 36 is of the usual Gaussian form, the beam 36 will cause the ultra-violet phosphor strip 42 to generate pips of ultra-violet light as shown by curve (V) of Fig. 2(*b*), there being one such pip for each traversal of the ultra-violet strip by the beam 36, so that the pips occur at a 7.16 megacycle rate.

The ultra-violet light index signals thus produced are received by the photocell 48 which produces a current wave form substantially identical to the curve (D), which wave form is amplified by a suitable circuit 60 and applied to one input terminal of a phase detector 62. The phase detector 62 also receives, via the lead 64, a reference wave of 3.58 megacycles and of fixed phase from the oscillator 52 and is operative to provide at the lead 66 a direct current voltage whose amplitude and polarity are, respectively, indicative of the amount and sense by which the input wave from the amplifier 60 differs in phase from the reference wave at the lead 64. Prior to describing the operation of the phase detector in determining or sensing the position of the beams with respect to an index strip, it is to be noted that the output signal of the phase detector 62 is amplified by a circuit 68 and applied to a vertical deflection winding 70 which is capable of producing an electromagnetic field for shifting the position of the beams in a vertical direction.

The operation of tracking apparatus of Fig. 1 will now be described in accordance with certain illustrative examples. Assuming, first, that the beams 34, 36 and 38 are properly scanning the red, blue and green phosphor strips R, B and G, respectively, the output of the photocell 48 will be a 7.2 megacycle signal, as explained above in connection with curve (D) of Fig. 2 (*b*). The phase detector 62 will produce substantially a zero output at the lead 66 in response to the 7.16 megacycle input, thereby making no change in the vertical positioning of the beams.

Assuming, as a second example, that the beams erroneously moved downwardly from their proper positions, the sinusoidal path of the beam 36 will be displaced with respect to ultra-violet strip 42, so that only the "positive peaks" of the sine wave intersect the strip 42. The resultant ultra-violet light signals as received by the photocell 48 will be a 3.58 megacycle signal as shown by wave form (E) of Fig. 2(*b*). This signal, when suitably amplified by the stage 60 and compared in phase with the reference 3.58 megacycle signal applied to the phase detector 62 will cause the phase detector to provide an output correction signal of such polarity and amplitude as to cause the winding 70 to produce a field which moves the beams upwardly to their correct positions.

As a third example, it may be assumed that the beams have erroneously moved upwardly from their proper positions, in which event ultra-violet light signal pips are produced by the "negative peaks" of the sine wave described by the beam 36. This ultra-violet signal, shown by curve (F) of Fig. 2(*b*) causes the phase detector 62 to apply to the winding 70 a current of the necessary amplitude and polarity for producing a field which moves the beams downwardly to their correct positions.

In the foregoing description of the operation of the apparatus of Fig. 1, electron beams of Gaussian electron distribution and of circular cross-section have been assumed. With such a beam, the actual vertical travel required for producing a tracking index signal need not be great, since the highest electron density in the beam occurs at its center. When electron beams used in a kinescope have uniform electron density, satisfactory results may also be obtained. In such case, it may be desirable to reduce the cross-sectional dimension of the beams and/or the width of the ultra-violet index strip, so that traversal of the strip by the beam between its upper and lower limits is reflected by a change in the amplitude of the ultra-violet signal.

Also, regardless of the particular electron density distribution of the beams used, it may be desirable to separate successive color phosphor strips by blank strips or "guard bands" in order to permit a wider swing of the center beam. It will be understood, in this regard, that the angular limits of rotatory oscillation to which the beams are subjected are practically determined by beam diameter and width of the phosphor strips, since it is undesirable for one beam to impinge upon more than one phosphor strip.

Since neither of the upper and lowermost beams 34 and 38 has any substantial vertical component of movement as a result of the rotational oscillation, there is no real danger that the beams can erroneously cause the tracking circuits to maintain the beams with, for example, the beam 34 scanning along the blue. phosphor strip B.

While tracking circuits are known in the art, circuitry suitable for performing the phase-detection function of the block 62 of Fig. 1 is illustrated schematically in Fig. 3. In Fig. 3, the index signal derived from the photocell 48 and amplified by the circuit 60 is applied to the signal input terminal 78 of a phase splitter 80, so that opposite phases of the index signal are applied via the capacitors 82 and 84 across the two halves of a resistance 86 which is center-tapped to ground, as shown. The reference phase signal from the lead 64 is shifted in phase by 90° through the agency of the transformer "T" and applied to the terminal 88. When the index signal input is a 7.16 megacycle signal (indicative of proper beam tracking), neither of the oppositely polarized diodes 90 and 92 will be conductive, so that no direct current voltage will be provided at the terminal 88.

When, on the other hand, the index signal applied to the terminal 78 is a 3.58 megacycle signal (resulting from mispositioning of the beams with respect to the ultra-violet light-producing strip), one of the two diodes 90 and 92 will conduct more heavily than the other, thereby providing a direct current voltage at the terminal 88 whose polarity and amplitude are, respectively, indicative and amount by which the index signal differs in phase from the reference signal. This output voltage or "correction signal" is applied via a resonant circuit 94 (which serves to trap undesired video frequencies) to the output terminal 66′, adapted for connection to the lead 66.

In the interest of completeness of description, it may be noted that the choice of which of the color phosphor strips R, B and G is to be provided with the ultra-violet phosphor strip along its center may be dictated by certain considerations having no direct bearing upon the tracking functions per se. The reason for the selection of the blue phosphor strip as the central one having the ultra-violet phosphor disposed along it is twofold. As is known, the acuity of the eye is such that changes in the brightness of blue light are not as noticeable as changes in the brightness of either green or red light. In order to prevent the vertical movement of the middle electron beam from being objectionably noticeable, the blue phosphor strip was selected, since no high frequency brightness changes of an advisable nature are produced by it. Secondly, of presently available phosphor materials, the blue phosphor is more efficient than either of the red and green phosphor materials. Hence, the blue phosphor is most capable of suffering the loss of light resulting from the fact that a certain portion of the phosphor strip is covered by ultra-violet light-producing material.

While the foregoing considerations have been pointed out to aid in the selection of which phosphor strip is to be provided with the index signal-producing strips, it will be understood that other considerations may require the choice of other of the color phosphor strips for different situations. Also, while index strips of ultra-violet light-emitting characteristics are described, other index elements such as secondary electron emitting elements may be used.

Although, as had been stated, the rotational oscillation of the beams is such that only the horizontally offset beam is subjected to a substantial vertical movement, so that there is little likelihood of an appreciable ultra-violet light index signal's being produced by either of the other two beams, it may, in certain instances, be desirable to "tag" the beam which is intended to produce the tracking index signals. An arrangement for performing this function is illustrated in Fig. 4 wherein reference numerals identical to those employed in Fig. 1 indicate corresponding elements. In Fig. 4, red, blue and green video signals are applied to the input terminals 14, 16 and 18 of the kinescope 20 for modulating the intensities of the electron beams 34, 36 and 38 which scan the screen 40. The blue beam 36 is additionally modulated by a high frequency tag signal (e. g., 15 megacycles) produced by the oscillator 100 and applied to the cathode 24. The tube 20 of Fig. 4 is, as in the case of the apparatus of Fig. 1, provided with a scanning deflection yoke 44, a rotating field-producing coil 50 and a beam position correction winding 70. As the beams 34, 36 and 38 scan across the screen 40 with the beams properly positioned with respect thereto, the beam 36 will, by virtue of the rotational oscillating field to which it is subjected, travel along a sinusoidal path centered on the ultra-violet strip 42. The ultra-violet light thus produced and picked up by the photocell 48 will be modulated at a 15 megacycle rate for distinguishing purposes. The 15 megacycle signal will, moreover, be amplitude-modulated by a 7.16 megacycle signal. A bandpass filter having its passband centered at 15 megacycles receives the output of the photocell 48 and applies it to an amplitude-detector or demodulator 102. The detector 102 removes the modulating information from the 15 megacycle "carrier" and applies it to a phase detector 62. The operation of the apparatus of Fig. 4 is, thereafter, the same as that described in connection with the apparatus of Fig. 1. If desired, the passband characteristic of the filter 101 may be so chosen as to pass only the 3.58 megacycle modulating components, since any modulating component greater than that frequency is indicative of proper tracking by the beams and need not be applied to the phase detector.

In the case of both Figs. 1 and 4, it should be noted that the optimum location of the center of rotation of the beams must be determined from the relative size of the phosphor strips with respect to beam diameter and the like. It will be apparent, however, that, when the center of rotation is located midway along the line joining the upper and lower beams and with the third beam offset perpendicularly from that line at the center of rotation, the offset beam will be subjected to the greatest vertical movement for the smallest vertical movement of the upper and lower beams.

From the foregoing, it will be understood that the present invention affords novel means for subjecting a plurality of electron beams in a cathode ray tube kinescope of the line screen variety to a rotational oscillatory movement whereby only one of the beams is caused to have an appreciable vertical component of movement. As a result of such action, there is afforded an arrangement for producing beam tracking index signals capable of accurately indicating the position of the beams with respect to the screen.

Having thus described my invention, what I claim as new and desire to secure by Letters Patent is:

1. Image reproducing apparatus comprising a cathode ray tube having a screen made up of a plurality of groups of horizontally oriented electron responsive strip-like elements of respectively different light-emitting characteristics and vertically spaced electron responsive beam position index signal-producing elements disposed parallel to said strip-like elements and means for producing and directing a plurality of electron beams toward said screen, said beams being spaced vertically from each other and one of said beams being horizontally displaced from another; means for causing said beams to scan said screen, as a group, in a direction parallel to said strip-like elements; and means for periodically causing said beams to rotate about a common axis.

2. Image reproducing apparatus comprising a cathode ray tube having a screen made up of a plurality of groups of horizontally oriented electron responsive strip-like elements of respectively different light-emitting characteristics and vertically spaced electron responsive beam position index signal-producing elements disposed parallel to said strip-like elements and means for producing and directing a plurality of electron beams toward said screen, said beams being spaced vertically from each other and one of said beams being horizontally displaced from another; means for causing said beams to scan said screen, as a group, in a direction parallel to said strip-like elements; and means for periodically causing said beams to rotate about a common axis, displaced horizontally from said horizontally displaced beam in the direction toward another of said beams.

3. Image reproducing apparatus comprising a cathode ray tube having a screen made up of a plurality of groups of horizontally oriented electron responsive strip-like elements of respectively different light emitting characteristics and vertically spaced electron responsive beam position index signal-producing elements disposed parallel to said strip-like elements and means for producing and directing a plurality of electron beams toward said screen, said beams being spaced vertically from each other and one of said beams being horizontally displaced from another; means for causing said beams to scan said screen, as a group, in a direction parallel to said strip-like elements; and means associated with said tube for causing said beams to oscillate rotationally about a common axis as they scan said screen.

4. Image reproducing apparatus comprising a cathode ray tube having a screen made up of a plurality of groups of horizontally oriented electron responsive strip-like elements of respectively different light-emitting characteristics and vertically spaced electron responsive beam position index signal-producing elements disposed parallel to said strip-like elements and means for producing and directing a plurality of electron beams toward said screen, said beams being disposed at the apices of a triangle, one side of which is generally transverse of said strip-like elements; means for causing said beams to scan said screen, as a group, in a direction parallel to said strip-like elements; and means for periodically causing said beams to rotate about a common axis.

5. Image reproducing apparatus comprising a cathode ray tube having a screen made up of a plurality of groups of horizontally oriented electron responsive strip-like elements of respectively different light-emitting characteristics and vertically spaced electron responsive beam position index signal-producing elements disposed parallel to said strip-like elements and means for producing and directing a plurality of electron beams toward said screen, said beams being disposed at the apices of a triangle, one side of which is generally perpendicular to said strip-like elements; means for causing said beams to scan said screen, as a group, in a direction parallel to said strip-like elements; and means for periodically causing said beams to rotate about a common axis.

6. Color image reproducing apparatus which comprises a color kinescope having means for producing and directing a plurality of electron beams toward a target screen made up of a plurality of groups of horizontally oriented electron responsive strip-like elements of respectively different component color light-emitting characteristics and horizontally oriented electron responsive beam position index signal-producing elements associated with certain ones of said strip-like color elements, said beams being spaced vertically from each other and a first one of said beams being displaced horizontally from a second one of said beams; means for causing said beams to scan across said screen horizontally in such manner that said first beam is adapted to scan along an index signal producing element; means for causing said beams to oscillate rotationally about a common axis such that the vertical component of resultant undulatory travel by said first beam is substantially greater than that of said second beam; and means responsive to signals from said signal-producing elements for controlling the vertical positioning of said beams.

7. The invention as defined by claim 6, said means for causing said beams to oscillate comprising an annular electro-magnetic coil surrounding a portion of said kinescope between said beam-producing means and said target screen and means for energizing said coil with alternating current.

8. Color image reproducing apparatus which comprises a color kinescope having means for producing and directing a plurality of electron beams toward a target screen made up of a plurality of groups of horizontally oriented electron responsive strip-like elements of respectively different component color light-emitting characteristics and horizontally oriented electron responsive beam position index signal-producing elements associated with certain ones of said strip-like color elements, said beams being spaced vertically from each other and one of said beams being displaced horizontally from another of said beams; means for causing said beams to scan across said screen parallel to said strip-like elements in such manner that said one beam scans along an index signal producing element; means for causing said beams to oscillate rotationally about a common axis offset horizontally from said one beam in the direction of a line passing vertically through another of said beams; and means responsive to signals from said signal-producing elements for controlling the vertical positioning of said beams.

9. Color image reproducing apparatus which comprises a color kinescope having means for producing and directing a plurality of electron beams toward a target screen made up of a plurality of groups of horizontally oriented electron responsive strip-like elements of respectively different component color light-emitting characteristics and horizontally oriented electron responsive beam position index-signal producing elements associated with certain ones of said strip-like color elements, said beams being arranged at the apices of a triangle, one side of which is substantially normal to said strip-like elements whereby one of said beams is horizontally displaced from the others; means for causing said beams to scan across said screen horizontally in such manner that said one beam is adapted to scan along an index signal producing element; means for causing said beams to oscillate about a common axis located on a line passing horizontally through said one beam and closer to said side of said triangle than to said one beam; and means responsive to signals from said signal-producing elements for controlling the positioning of said beams.

10. Color image reproducing apparatus which comprises a color kinescope having means for producing and directing a plurality of electron beams toward a target screen made up of a plurality of groups of horizontally oriented electron responsive strip-like elements of respectively different component color light-emitting characteristics and horizontally oriented electron responsive beam position index-signal producing elements associated with certain ones of said strip-like color elements, said beams being arranged at the apices of a triangle, one side of which is substantially normal to said strip-like elements whereby one of said beams is horizontally displaced from the others; means for causing said beams to scan across said screen horizontally in such manner that said one beam is adapted to scan along an index signal producing element; means for causing said beams to oscillate about a common axis; and means responsive to signals from said signal-producing elements for controlling the positioning of said beams.

11. Image reproducing apparatus comprising a cathode ray tube having a screen made up of a plurality of groups of horizontally oriented electron responsive strip-like elements of respectively different light-emitting characteristics and vertically spaced electron responsive beam position index signal-producing elements disposed parallel to said strip-like elements and means for producing and directing a plurality of vertically spaced electron beams toward said screen; means for causing said beams to scan said screen, as a group, in a direction parallel to said strip-like elements; and means for causing said beams to oscillate.

12. The invention as defined by claim 11 including means for applying a high-frequency tag signal to one of said beams.

13. The invention as defined by claim 11, wherein said last-named means comprises means for producing rotational oscillation of said beams.

14. The invention as defined by claim 13 including means for modulating the intensity of one of said beams with a distinctive tag signal.

References Cited in the file of this patent

UNITED STATES PATENTS 2,701,821 Alexanderson ------------ Feb. 8, 1955